United States Patent
Tran

(10) Patent No.: US 8,320,920 B1
(45) Date of Patent: Nov. 27, 2012

(54) METHOD FOR DECOMMISSIONING WIRELESS TRANSMISSION SITES

(75) Inventor: Thuy Thomas Tran, Fairfax, VA (US)

(73) Assignee: Nextel Communications, Inc., Reston, VA (US)

(*) Notice: Subject to any disclaimer, the term of this patent is extended or adjusted under 35 U.S.C. 154(b) by 1528 days.

(21) Appl. No.: 11/455,021

(22) Filed: Jun. 15, 2006

(51) Int. Cl.
*H04W 40/00* (2009.01)

(52) U.S. Cl. ......... 455/446; 455/447; 455/448; 455/449

(58) Field of Classification Search ........... 455/446–449
See application file for complete search history.

(56) References Cited

U.S. PATENT DOCUMENTS

| | | | |
|---|---|---|---|
| 2003/0171132 A1* | 9/2003 | Ho et al. | 455/522 |
| 2004/0214583 A1* | 10/2004 | Graham et al. | 455/453 |
| 2005/0079872 A1* | 4/2005 | Hutcheson et al. | 455/446 |
| 2006/0182074 A1* | 8/2006 | Kubler et al. | 370/338 |
| 2007/0015514 A1* | 1/2007 | Bishop | 455/445 |

* cited by examiner

*Primary Examiner* — Amancio Gonzalez

(57) ABSTRACT

Methods for decommissioning wireless transmission sites include calculating coverage radii for wireless transmission stations, and representing the wireless transmission stations as a two-dimensional grid. In one embodiment, the virtual cells that comprise the grid having a virtual cell size that is based on the coverage radii. Virtual grid cells having excess wireless transmission stations are identified. Particular excess wireless transmissions stations are then selected for decommissioning based on a predetermined factor.

27 Claims, 6 Drawing Sheets

METHOD FOR DECOMMISSIONING WIRELESS TRANSMISSION SITES

FIELD OF THE INVENTION

The present invention relates generally to the field of telecommunications, and in particular, to the selective decommissioning of wireless transmission sites.

BACKGROUND OF THE INVENTION

In providing cellular telephone services, telecommunications providers are always interested in providing feature-rich, high-quality service using the least cost network deployment. Accordingly, there is a desire to constantly develop and deploy improved transmission technologies. Such technologies may include new transmission protocols, frequencies and/or techniques which often times need to be deployed across expansive geographic regions of the world.

However, improved transmission technology often translates into changing the coverage radius of existing wireless transmission sites. That is, the coverage radius of a given transmission site can dramatically increase after the deployment of the new technology, thereby creating an excess number of transmission sites. This can represent a pronounced network inefficiency given the high cost of maintaining these excess transmission sites.

Accordingly, it is likely that deployment of improved transmission technologies will result in a corresponding need to decommission certain existing transmission sites. The problem presented is one of selection. Namely, the process of selecting which sites should be decommissioned is currently a labour-intensive one, in which technicians engage in the manual process of essentially "eyeballing" which sites should be decommissioned. When the geographic area involved in this process spans cities and even counties, it can be a daunting process. As such, there is a need in the art for improving and even automating the process of selectively decommissioning excess wireless transmission sites.

SUMMARY OF THE INVENTION

Methods for selecting one or more transmission stations for decommissioning are disclosed and claimed herein. In one embodiment, a method includes calculating coverage radii for a plurality of wireless transmission stations, and representing a geographical area encompassing the plurality of wireless transmission stations as a two-dimensional grid comprised of a plurality of virtual cells each having a virtual cell size that is based on the coverage radii. The method further includes identifying a first virtual cell of the plurality of virtual cells as having more than one of the plurality of wireless transmission stations, and then selecting at least one of the plurality of wireless transmission stations within the first virtual cell for decommissioning based on a predetermined factor.

Other aspects, features, and techniques of the invention will be apparent to one skilled in the relevant art in view of the following description of the exemplary embodiments of the invention.

DETAILED DESCRIPTION OF THE EXEMPLARY EMBODIMENTS

Figure 1:
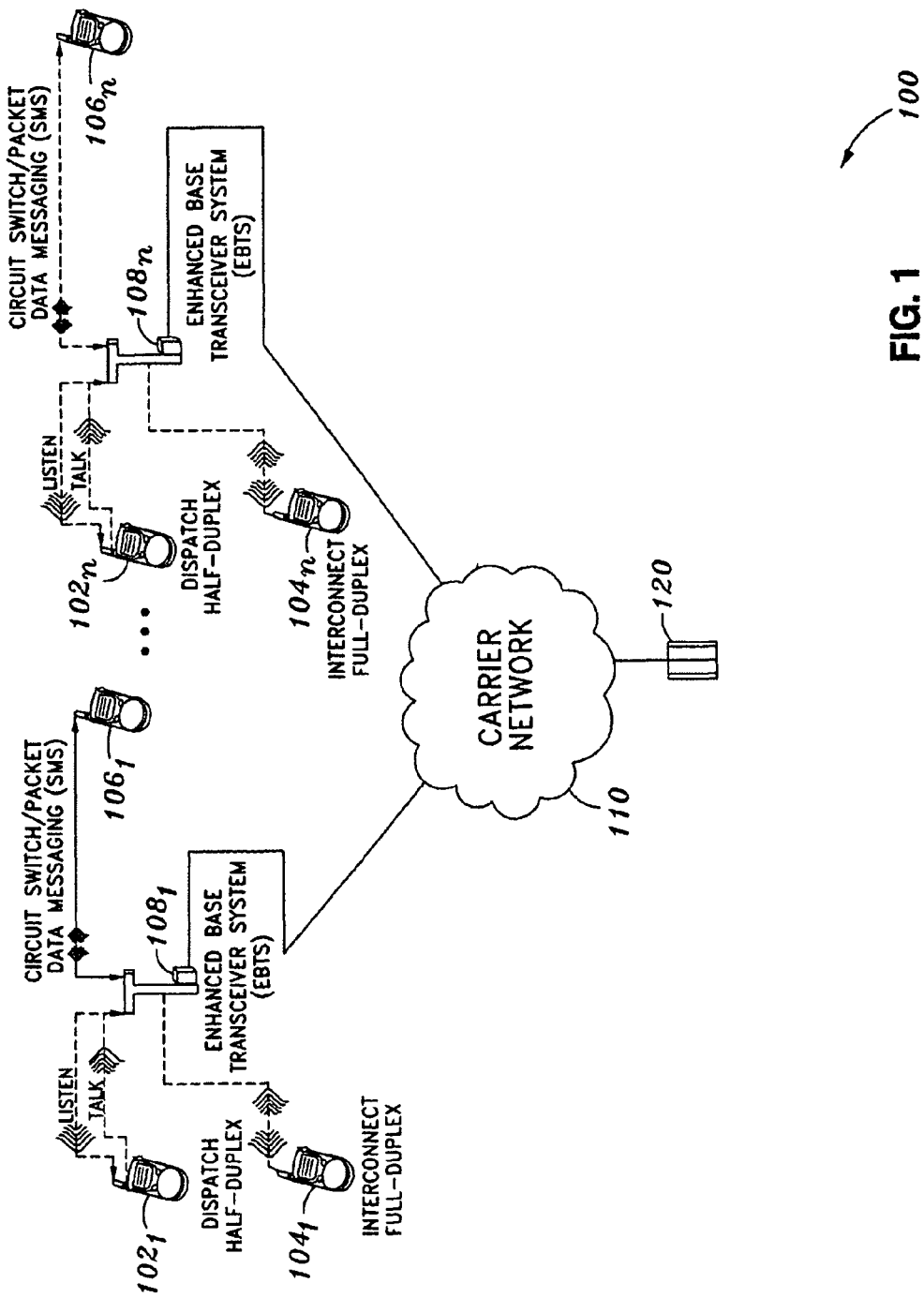
FIG. 1 illustrates an embodiment of a communication system capable of implementing one or more aspects of the invention.

Methods for decommissioning wireless transmission sites are disclosed. In one aspect of the invention, the coverage radii for a number of wireless transmission stations are computed. In certain embodiments, the wireless transmission stations comprise at least a portion of a telecommunications network. In some embodiment, calculating the coverage radii is based on one or both of a link budget analysis and a propagation model for each of the wireless transmission stations. The link budget analysis may yield an updated link budget that is different than a previous link budget due to some network modification.

Another aspect of the invention is to represent the geographical area that encompasses the wireless transmission stations as a two-dimensional grid comprised of a plurality of virtual cells having one or more virtual cell sizes that are based on the previously calculated coverage radii. In certain embodiment, a grid orientation may be chosen such that the excess number of transmissions stations across the geographical area is maximized. Such a grid orientation may include one or more of a unique geographic reference point, grid dimensions and the number of virtual grid cells.

Virtual grid cells having one or more excess transmission stations may then be identified. In one embodiment, this identification process is carried out by comparing the number of wireless transmission stations within a given virtual cell to a predetermined amount. In one embodiment, this predetermined amount may be one, such that any virtual grid cell containing more than one wireless transmission station will be deemed to have excess transmission sites.

Once at least one excess transmission station has been identified, the particular transmission stations within each virtual grid cell that are to be decommissioned are selected based on a predetermined factor. In one embodiment, the predetermined factor may be a measure of how much network traffic is handled by each transmission station. Those excess stations handling the least amount of traffic, for example, may be selected for decommissioning. Alternatively, the predetermined factor may be a measure of how close each transmission station is to a geographical center of a given virtual grid cell.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a "processor readable medium" that may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, etc. The code segments may be downloaded via computer networks such as the Internet, Intranet, etc.

Referring now to the figures, FIG. 1 illustrates a block diagram of an exemplary telecommunications system 100 in which one or more aspects of the invention may be implemented. In certain embodiments, the telecommunications system 100 is an iDEN system, such as the iDEN network owned and operated by Sprint Nextel, Inc. of Reston, Va. However, the telecommunication network of FIG. 1 may similarly be a Global System for Mobile (GSM) network, Code Division Multiple Access (CDMA) network, a Time Division Multiple Access (TDMA) network, any wireless cellular-like network or a Public Switched Telephone Network (PSTN). As shown in FIG. 1, the telecommunications system 100 may serve a plurality of dispatch subscriber units $102_1$-$102_n$, a plurality of interconnect subscriber units $104_1$-$104_n$, and a plurality of SMS subscriber units $106_1$-$106_n$ (collectively, "subscriber units 102-106"), all of which may communicate with a plurality of transmission stations $108_1$-$108_n$. While the embodiment described herein is an iDEN network, it is readily understood that other known networks may be used; such as CDMA, GSM, etc. The subscriber units are the end-user interface to the telecommunications network 100. It should be appreciated that subscriber units 102-106 may be comprised of phones, pagers, modems, mobile transceivers, personal digital assistants, end-user base transceivers, or similar devices capable of communicating over the carrier network 110. Subscriber units 102-106 may be capable of dispatch calling, interconnect calling, roaming, message mail and/or data communications.

Transmission stations $108_1$-$108_n$ may be comprised of base station radios and control equipment contained in an Enhanced Base Transceiver System (EBTS). Such transmission sites may be used to provide the RF link between the carrier network 110 and the various subscriber units 102-106. Transmission sites may further provide connectively between subscriber units 102-106 and an external network 112. Wireless communication between transmission stations $108_1$-$108_n$ and subscriber units 102-106 occurs via encoded radio frequency (RF) channels which provide physical paths over which digital communication signals such as voice and data are transmitted. Each transmission station $108_1$-$108_n$ has a coverage radius which is a function of the sites link budget and propagation model, each of which will now be described.

While the details of calculating a transmission site's link budget are known in the art and beyond the scope of this disclosure, the term 'link budget' generally refers to the amount of transmitter power that will arrive at a far-end receiver. Power traveling across a wireless link will expand radially in all directions. The further the wireless power travels, the more it will spread out and the quicker the power level will decrease. Because wireless power spreads in all directions, it decreases logarithmically according to the "inverse-square" law. Some of the values used in calculating a site's link budget includes transmission frequency, free space path loss, transmitter power, antenna gain, available bandwidth, receiver sensitivity, and path length.

Each transmission site will have a unique propagation model, as known in the art, that is dictated by the site's environment, including surrounding terrain, foliages and buildings. Additional factors include the height of the transmission site, the height of the receiver, and the carrier frequency. Commonly used propagation models include the Hata model and the Co-operative for Scientific and Technical research (COST)-231 model. Using one of these known models, path loss can be calculated for varying terrain, including rural, suburban and urban environments.

Using a link budget analysis and the path loss computed according to a propagation model, the coverage radius for a given transmission site can be readily computed.

Figure 2:
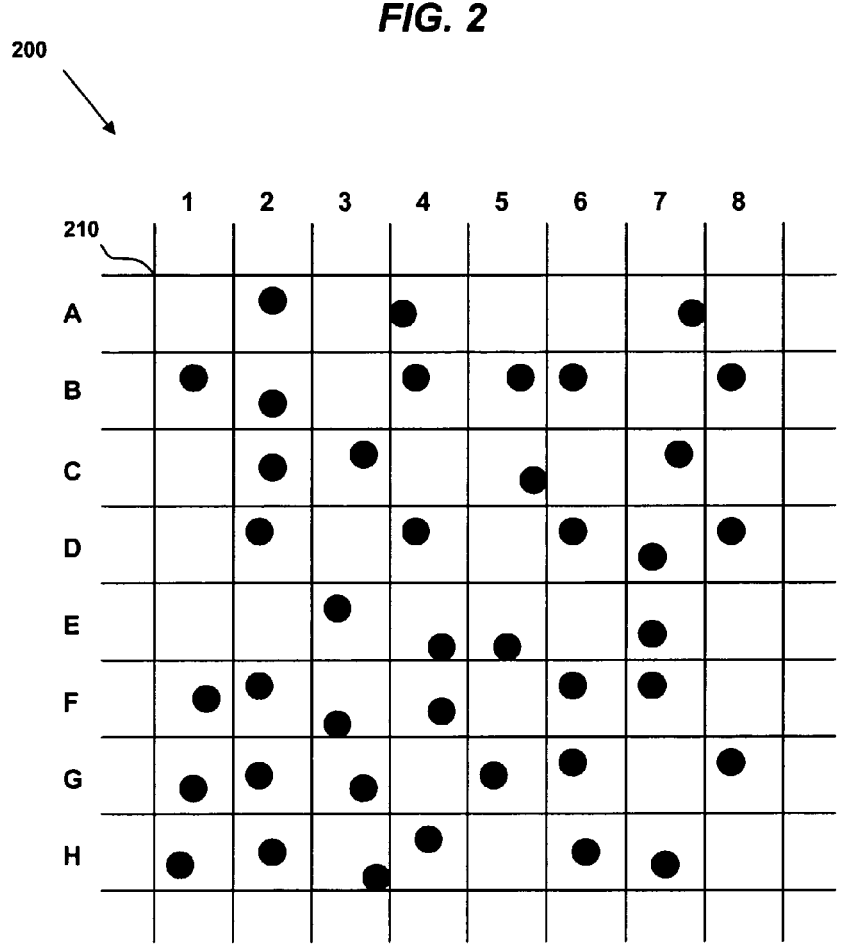
FIG. 2 illustrates a coverage grid of an existing wireless network comprised of a plurality of wireless transmission stations.
Figure 2:
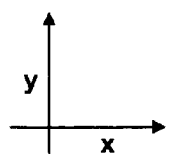

Referring now to FIG. 2, depicted is a coverage grid 200 for an existing wireless network, such as telecommunications system 100, that is comprised of a plurality of wireless transmission stations (e.g., transmission stations $108_1$-$108_n$). The transmission stations, represented by black dots, are disposed across the coverage grid 200 which in this embodiment is comprised of individual virtual cells A1-H8. In one embodiment, the size of the individual virtual cells of grid 200 is based on the coverage radii of the existing transmission stations. Note that some of the virtual cells may not have wireless coverage at all, e.g., cell A1, A5, F8, etc.

Grid 200 includes a reference point 210, which represents a uniquely identifying reference value 210. In one embodiment the reference value may be a set of coordinates. Given the reference value 210 and the known grid size, the exact geographical area covered by grid 200 can be determined. In another embodiment, the entire Earth surface can be described by a set of reference values and corresponding grid sizes, which may vary from grid to grid.

While FIG. 2 represents the current wireless coverage for a given network of transmissions stations, many technological improvements will materially affect the existing coverage map. For example, implementation of new transmission protocols, changing the transmission frequency and/or power, will all result in a corresponding change to the stations' link budgets and therefore their coverage radii. The result of this is that a number of the transmission stations depicted on grid 200 will not be needed to maintain the same (or better) level of coverage. As such, it will become desirable to selectively decommission one or more of the existing transmission sites to reduce the costs associated therewith. Accordingly, it is one goal of the invention to be able to easily select particular transmission stations that should be decommissioned, while simultaneously not reducing the level of coverage.

Figure 3A:
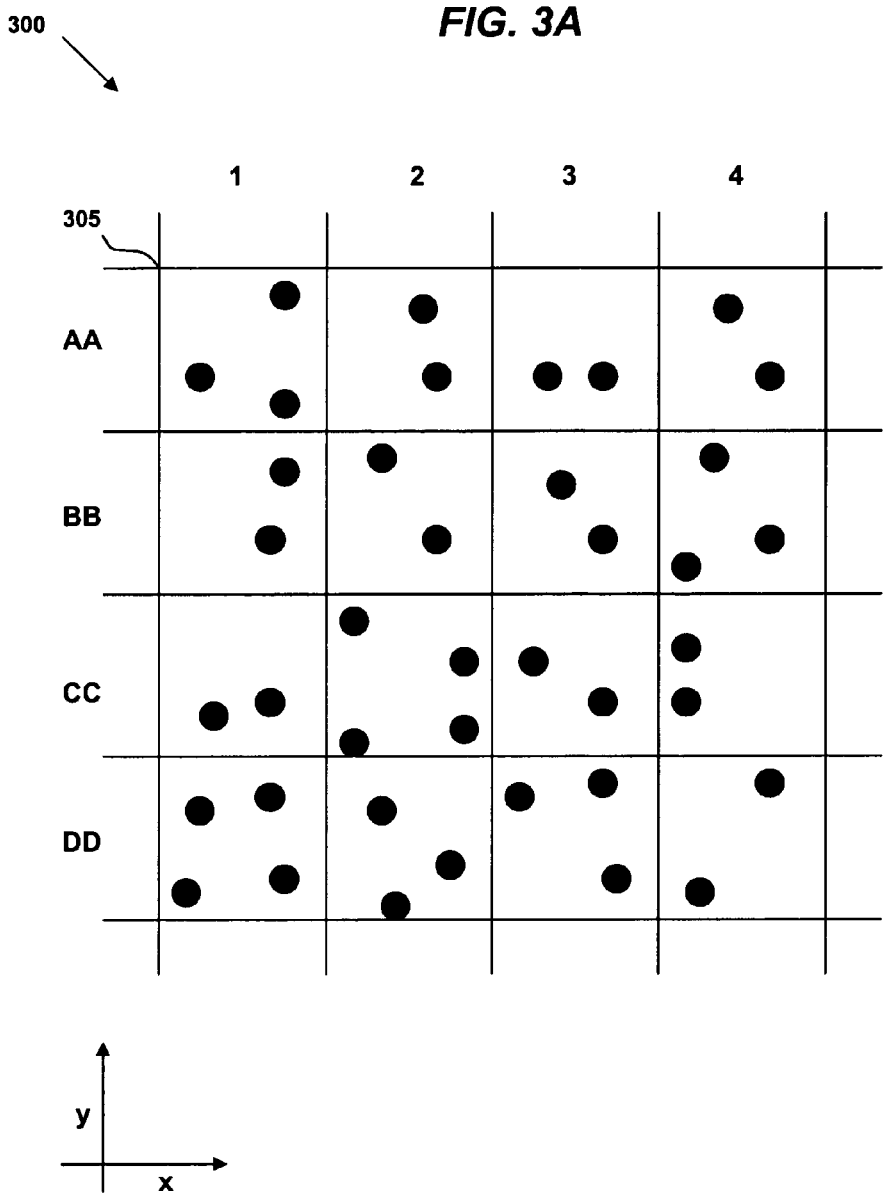
FIGS. 3A-3C illustrate embodiments of coverage grids for a new overlay network based on one or more changes to the existing wireless network of FIG. 2.

To that end, FIG. 3A depicts one embodiment of a coverage grid 300 for a new overlay network after one or more coverage-affecting changes has been made to the existing wireless network of FIG. 2. Grid 300, which has unique reference point 305, is comprised of individual virtual grid cells AA1-DD4. While grid 300 is shown as being a 4×4 grid having a particular labeling convention, it should equally be appreciated that numerous other grid embodiments would be consistent with the principles of the invention. Moreover, while grid 300 contains the same collection of transmission stations as FIG. 2, this was done in order to show the resulting larger coverage radii that would be available after implementing a coverage-altering technology modification. However, it should equally be appreciated that, depending on the design criteria, grid 300 may have different dimensions than grid 200, and even a difference reference point. For example, one design criteria may be to decommission the most number of existing transmissions stations. In this case, it would be preferable to choose a grid reference point and size which, through a series of computational iterations, yields the most number of excess stations.

Regardless of the aforementioned grid particulars, the individual virtual cell sizes for grid 300 may be determined based on the coverage parameters of the new overlay network in which the coverage radius of the existing individual transmission stations has been altered. In this embodiment, the coverage radius for the individual transmission stations has increased, thereby creating an excess of number of stations. It should be appreciated that the coverage radius for a given transmission station may be altered by changing transmission protocols, frequencies, transmission power, etc. As previously mentioned, the coverage radius for a given transmission station or group of transmission stations may be computed using the newly-computed link budgets and propagation models. While in one embodiment, the coverage-affecting change will affect the link budgets, it should be appreciated that the propagation model applicable to a given transmission station may or may not experience a corresponding change. In any event, by simply supplying the changed parameter (e.g., frequency, transmission power, etc.), the new coverage grid 300 can be automatically computed.

Figure 3B:
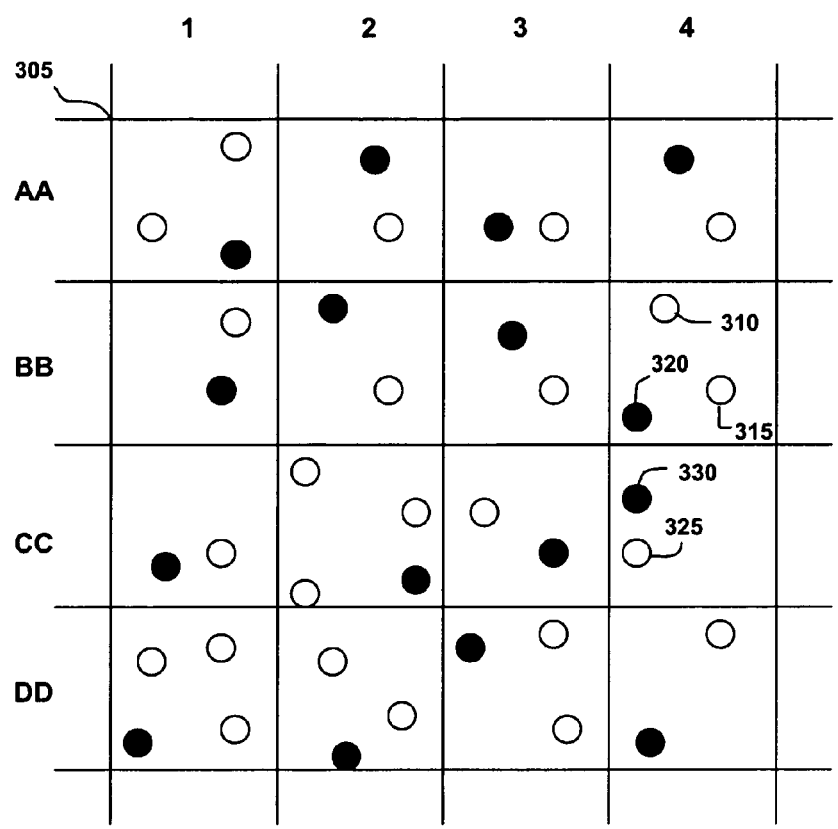
Figure 3B:
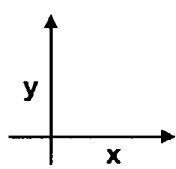

Referring now to FIG. 3B, depicted is the grid 300 in which particular excess transmissions stations have been selected for decommissioning. In one embodiment, when a particular virtual grid cell has one or more excess stations, the stations to be decommissioned may be based on those stations exhibiting the least amount of wireless traffic. However, other criteria may similarly be used to select which of the sites within a given virtual grid cell should be decommissioned.

In virtual cell BB4, for example, stations 310 and 315 have been selected for decommissioning, while station 320 will remain and provide coverage for the newly expanded virtual cell BB4. Virtual cell BB4 occupies the same area as did virtual cells C7, C8, D7 and D8 of grid 200. Thus, in this embodiment, the new network overlay shows the coverage-affecting change will enable a single station 320 to actually provide superior coverage than that of three sites using the previous technology. In another example, station 325 has been selected for decommissioning while station 330 will provide coverage for all of virtual cell CC4, previously comprised of virtual cells E7, E8, F7 and F8. As previously mentioned, stations 310, 315 and 325 may have been selected for decommissioning based on the fact that such stations experienced lower wireless traffic.

Figure 3C:
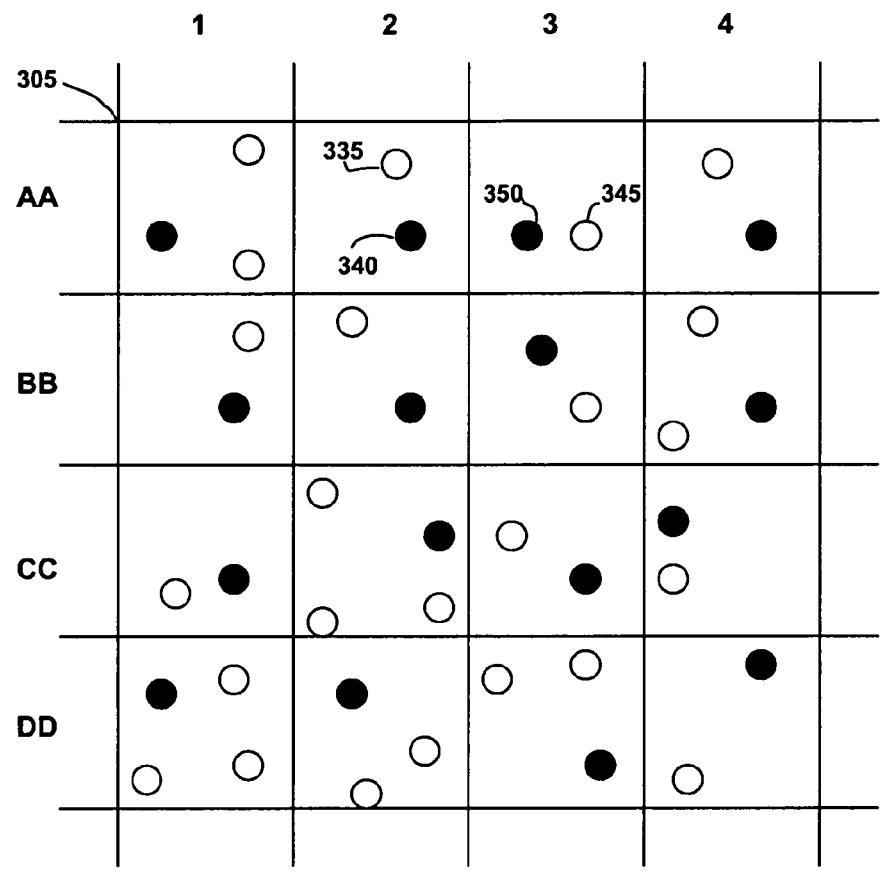
Figure 3C:
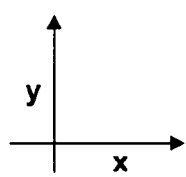

FIG. 3C depicts yet another embodiment of grid 300 in which particular excess transmissions stations have been selected for decommissioning based, when possible, on a determination of which stations are closest to the center of a given virtual grid cell, and therefore able to provide more evenly distributed coverage across the overall grid 300. For example, in the embodiment of FIG. 3B there is a relatively large distance between the remaining station in virtual cell AA4 and that of virtual cell BB4. In contrast, this distance is much shorter in the embodiment of FIG. 3C, thereby possibly providing more uniform coverage. Again however, other criteria may similarly be used to select which sites should be decommissioned.

Figure 4:
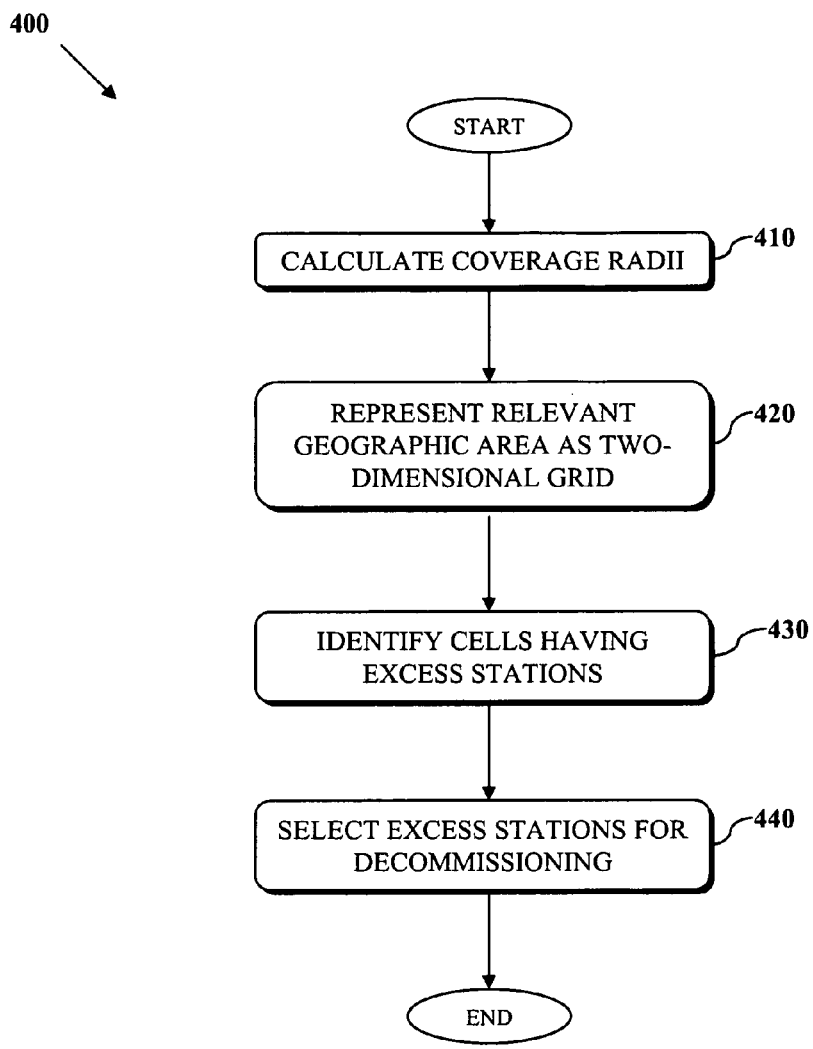
FIG. 4 illustrates one embodiment of a process for carrying out certain aspects of the invention.

FIG. 4 is one embodiment of a process for implementing one or more aspects of the invention. In particular, process 400 implements one approach for automating the process of selectively decommissioning excess wireless transmission sites after a coverage-altering modification has been made to the wireless network. Process 400 begins at block 410 with the calculation of the coverage radii for the wireless transmission stations (e.g., transmission stations $108_1$-$108_n$) which comprise at least a portion of a communications network, such as telecommunications system 100. In one embodiment, this may be accomplished using a link budget analysis and path loss computed according to a propagation model for each of the transmission stations in question. In some embodiments it may be necessary to also consider the sensitivity of the wireless receivers (e.g., subscriber units 102-106) that will be communicating with the transmission stations.

At block 420, a geographic a geographical area containing or otherwise encompassing the relevant wireless transmission stations may be identified and represented as a two-dimensional grid comprised of a plurality of virtual cells. In one embodiment, the plurality of virtual cells may have a uniform virtual cell size that is based on the calculated coverage radii for the subject transmission stations. In another embodiment, the grid may have virtual cells of varying sizes, depending on the link budgets and propagation models for each particular station. Similarly, the plurality of virtual cells which comprise the grid may be of virtually any shape, such as octagonal.

In other embodiments, the grid may be labeled with a unique reference point (e.g., coordinates) usable to geographically locate the grid. Given the reference value and the known grid size, the exact location of the geographical area identified at block 420 may be determined.

Process 400 may then continue to block 430 where virtual cells of the aforementioned grid containing excess transmissions sites may be identified. In certain embodiments, any individual virtual cell having more than one transmission station will be identified as having excess stations. However, this may assume that a single transmission station has a sufficient coverage radius for the entire virtual cell in which it is located. Accordingly, in another embodiment virtual cells may be identified as having excess stations whenever the number of transmission stations within a given virtual cell exceeds some predetermined amount, where this predetermined amount is based on a desired level of wireless communication coverage.

Continuing to refer to FIG. 4, at this point process 400 may continue to block 440 where the actual selection of the excess stations for decommissioning is performed. In one embodiment, when a particular virtual grid cell has one or more excess stations, the stations selected to be decommissioned at block 440 may be based on those stations exhibiting the least amount of wireless traffic. Alternatively, the one or more excess stations selected for decommissioning at block 440 may be based on how far the stations are from the center of the grid in which they are contained. That is, for a given virtual cell containing one or more excess stations, the station(s) located closest to the center of the virtual cell will not be selected for decommissioning.

The disclosed embodiments are illustrative of the various ways in which the present invention may be practiced. Other embodiments can be implemented by those skilled in the art without departing from the spirit and scope of the present invention. For example, while the process of FIG. 4 has been described in the above embodiments, the order of one or more of the acts depicted in FIG. 4 may be changed while still conforming to the principles of the invention. For the sake of simplicity, the process of FIG. 4 has been defined in general steps and it should be appreciated that other steps consistent with the principles of the invention may be included.

What is claimed is:

1. A method for selecting one or more transmission stations for decommissioning, comprising the acts of:

calculating coverage radii for each of a plurality of wireless transmission stations;

representing a geographical area encompassing the plurality of wireless transmission stations as a two-dimensional grid comprised of a plurality of virtual cells each having a virtual cell size that is based on said coverage radii;

selecting a grid orientation for the two-dimensional grid in order to maximize an excess number of transmissions stations to be decommissioned across the geographical area, wherein the grid orientation includes a unique fixed geographic reference point;

identifying a first virtual cell of the plurality of virtual cells as having more than one of the plurality of wireless transmission stations; and selecting at least one of the plurality of wireless transmission stations within the first virtual cell for decommissioning based on a predetermined factor.

2. The method of claim 1 wherein calculating comprises calculating a link budget for each of the plurality of wireless transmission stations.

3. The method of claim 2 wherein said link budget is an updated link budget that is different than a previous link budget due to a network modification.

4. The method of claim 1, wherein the grid orientation further includes at least one of grid dimensions and a number of virtual grid cells.

5. The method of claim 1 wherein selecting comprises selecting one of the plurality of wireless transmission stations within the first virtual cell for decommissioning based on an amount of wireless traffic currently handled by each of the plurality of wireless transmission stations within the first virtual cell.

6. The method of claim 1 wherein selecting comprises selecting one of the plurality of wireless transmission stations within the first virtual cell for decommissioning based on which of the plurality of wireless transmission stations within the first virtual cell is oriented closest to a center of the first virtual cell.

7. The method of claim 1, wherein the plurality of wireless transmission stations are base stations serving a telecommunications network.

8. The method of claim 1, further comprising the acts of:
identifying any additional virtual cells in the two-dimensional grid having more than one of the plurality of wireless transmission stations; and
selecting from among the plurality of wireless transmission stations within the addition virtual cell for decommissioning based on the predetermined factor.

9. A method for selecting excess wireless transmissions stations for decommissioning, comprising the acts of:
calculating coverage radii for each of a plurality of wireless transmission stations;
representing a geographical area encompassing the plurality of wireless transmission stations as a two-dimensional grid comprised of a plurality of virtual cells having one or more virtual cell sizes based on said coverage radii;
selecting a grid orientation for the two-dimensional grid in order to maximize an excess number of transmissions stations to be decommissioned across the geographical area, wherein the grid orientation includes a unique fixed geographic reference point;
identifying a first virtual cell from the plurality of virtual cells as having one or more excess transmission stations when the first virtual cell contains a number of the plurality of wireless transmission stations which exceeds a predetermined amount;
identifying at least one excess transmission station from the plurality of wireless transmission stations within the first virtual cell based on a predetermined factor; and
selecting the at least one excess transmission station for decommissioning.

10. The method of claim 9 wherein calculating comprises calculating a link budget for each of the plurality of wireless transmission stations.

11. The method of claim 10 wherein said link budget is an updated link budget that is different than a previous link budget due to a network modification.

12. The method of claim 9 wherein the grid orientation further includes at least one of grid dimensions and a number of virtual grid cells.

13. The method of claim 9 wherein identifying the at least one excess transmission station comprises identifying the at least one excess transmission based on an amount of wireless traffic currently handled by each of the plurality of wireless transmission stations within the first virtual cell.

14. The method of claim 9 wherein identifying the at least one excess transmission station comprises identifying the at least one excess transmission based on a proximity of each of the plurality of wireless transmission stations to a center of the first virtual cell.

15. The method of claim 9, wherein the plurality of wireless transmission stations are base stations serving a telecommunications network.

16. The method of claim 9, further comprising the acts of:
identifying any additional virtual cells in the two-dimensional grid having excess transmission stations; and
selecting from among the plurality of wireless transmission stations within the addition virtual cell for decommissioning based on the predetermined factor.

17. A computer program product, comprising:
a processor readable medium having computer executable program code embodied therein to select, for decommissioning, excess wireless transmissions stations of a telecommunications network, the computer executable program code in said computer program product comprising:
computer executable program code to calculate coverage radii for each of a plurality of wireless transmission stations;
computer executable program code to represent a geographical area encompassing the plurality of wireless transmission stations as a two-dimensional grid comprised of a plurality of virtual cells having one or more virtual cell sizes based on said coverage radii;
computer executable program code to select a grid orientation for the two-dimensional grid in order to maximize an excess number of transmissions stations to be decommissioned across the geographical area, wherein the grid orientation includes a unique fixed geographic reference point;
computer executable program code to identify a first virtual cell from the plurality of virtual cells as having one or more excess transmission stations when the first virtual cell contains a number of the plurality of wireless transmission stations which exceeds a predetermined amount;
computer executable program code to identify at least one excess transmission station from the plurality of wireless transmission stations within the first virtual cell based on a predetermined factor; and
computer executable program code to select the at least one excess transmission station for decommissioning.

18. The computer program product of claim 17, wherein the computer executable program code to calculate comprises computer executable program code to calculate a link budget for each of the plurality of wireless transmission stations.

19. The computer program product of claim 17 wherein the grid orientation further includes at least one grid dimensions and a number of virtual grid cells.

20. The computer program product of claim 17 wherein the computer executable program code to identify the at least one excess transmission station comprises computer executable program code to identify the at least one excess transmission based on an amount of wireless traffic currently handled by each of the plurality of wireless transmission stations within the first virtual cell.

21. The computer program product of claim 17 wherein the computer executable program code to identify the at least one excess transmission station comprises computer executable program code to identify the at least one excess transmission based on a proximity of each of the plurality of wireless transmission stations to a center of the first virtual cell.

22. The method of claim 1, wherein the two-dimensional grid comprises a plurality of virtual cells which are non-overlapping virtual cells.

23. The method of claim 9, wherein the two-dimensional grid comprises a plurality of virtual cells which are non-overlapping virtual cells.

24. The computer program product of claim 17, wherein the two-dimensional grid comprises a plurality of virtual cells which are non-overlapping virtual cells.

25. The method of claim 1, wherein calculating the coverage radii comprises calculating coverage radii for each of the plurality of existing wireless transmission stations that would be available after implementing a coverage-altering technology modification to the plurality of existing wireless transmission stations.

26. The method of claim 9, wherein calculating the coverage radii comprises calculating coverage radii for each of the plurality of existing wireless transmission stations that would be available after implementing a coverage-altering technology modification to the plurality of existing wireless transmission stations.

27. The computer program product of claim 17, wherein computer executable program code to calculate coverage radii comprises computer executable program code to calculate coverage radii for each of the plurality of existing wireless transmission stations that would be available after implementing a coverage-altering technology modification to the plurality of existing wireless transmission stations.

* * * * *